United States Patent Office 3,437,616
Patented Apr. 8, 1969

3,437,616
BINDING AGENT SYSTEMS CONTAINING POLYMERIC TRIMETHYLENE OXIDE DERIVATIVES WITH POLYETHER SIDE CHAINS AS LACQUER ADJUVANTS
Joachim Nentwig, Krefeld-Bockum, Hermann Schnell, Krefeld-Urdingen, Rolf Dhein and Karl Raichle, Krefeld-Bockum, and Herbert Gebauer, Krefeld, Germany, assignors to Farbenfabriken Bayer Aktiengesellschaft, Leverkusen, Germany, a corporation of Germany
No Drawing. Filed May 13, 1965, Ser. No. 455,618
Claims priority, application Germany, June 11, 1964, F 43,145
Int. Cl. C08g 23/04; C09d 3/56, 3/66
U.S. Cl. 260—22                                   5 Claims

ABSTRACT OF THE DISCLOSURE

The combination of a water-dilutable solution of an alkyd resin, a phenol resin, an amino resin or mixtures thereof and a polymeric trimethylene oxide derivative having polyether side chains provides a binding agent system having improved foam-inhibiting and flow properties.

---

Binding agents which can be diluted with water are of increasing importance in the lacquer industry. However, it is a disadvantage that binding agents of this type show, especially when used in connection with application by dipping or pouring on, foam formation which can sometimes be considerable and which renders a uniform lacquering very difficult.

The invention is concerned with the use of polymeric trimethylene oxide derivatives with polyether side chains as foam-inhibiting and flow-promoting lacquer adjuvants in binding agent systems which can be diluted with water.

By the combination of these two properties in the polymeric trimethylene oxide derivatives with polyether side chains, the formation of foam is reduced to a minimum so that binding agent systems which can be diluted with water and which have a content of these compounds are suitable especially for application by dipping or pouring on. Any foam bubbles which may be formed burst very quickly on the lacquer surfaces so that crater formation or other impairments of the lacquer surfaces do not occur. Furthermore, the polymeric trimethylene oxide derivatives with polyether side chains to be used according to the present invention are, from a chemical standpoint, extraordinarily stable as a result of the absence of saponifiable groups, which is of particular importance in the case of the frequently alkaline systems of the binding agents which can be diluted with water. On the other hand, the favourable mechanical properties of the lacquerings, especially their water stability, is practically unaffected by the added adjuvants.

A further advantage of the lacquer adjuvants to be used according to the invention is that they possess a good efficacy, even in very small amounts. Good results are, for example, even achieved by the addition of about 0.1% by weight, referred to the solids content of the binding agent. There can also be used smaller or larger amounts, for example, up to about 10%. In general, especially good results are achieved with additions of about 0.3 to about 5%.

The lacquer adjuvants in question can also be advantageously used in the case of lacquering in electrophoresis baths, a substantial reduction of the foaming thereby occurring without an disadvantageous effect on the electrophoretic coating.

The above mentioned trimethylene oxide derivatives with polyether side chains correspond to the general formula:

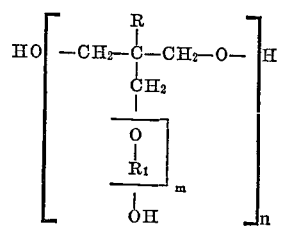

wherein R represents an alkyl residue or the hydroxy methyl or the hydroxy ethyl group, $R_1$ the ethylene or/ and the propylene group, and $m$ and $n$ a whole number greater than 1. $m$ may have, for instance, a value from 1 to about 100 and $n$ a value from 1 to about 30. Such products wherein $m$ represents a number from about 3 to about 30 and $n$ a number from about 3 to about 10 are preferred.

Among the alkyl residues according to the formula there may be mentioned for instance: the methyl, the ethyl, the propyl, the isopropyl, the butyl, the isobutyl, the amyl, the isoamyl, the hexyl, the isohexyl, the heptyl, the isoheptyl, the octyl, the isooctyl, the nonyl, the isononyl, the decyl, the isodecyl, the undecyl, the isoundecyl, the dodecyl, the isododecyl group, and all other alkyl groups up to about 30 carbon atoms in unbranched or branched chains.

They may be produced, for example, by the polymerization of hydroxyl group containing trimethylene oxide derivatives up to a polymerization degree of about 30 and reaction of the polymers thus obtained with alkylene oxides, such as methylene oxide, propylene oxide, etc., up to the production of polyether chains having from about 1 to about 100 alkylene ether units or by the reaction of monomeric hydroxyl group-containing trimethylene oxide derivatives with alkylene oxides as mentioned above and subsequent polymerization of the so-obtained trimethylene oxide derivatives up to a polymerization degree as mentioned above, for example, by processes as described in U.S. Patent No. 2,917,468.

As suitable hydroxyl group-containing trimethylene oxide derivatives as starting material for that processes, there may, for example, be mentioned 3-ethyl-3-methylol-oxacyclobutane, 3-propyl-3-methylol-oxacyclobutane, 3-hydroxy-oxacyclobutane and 3,3-dimethylol-oxacyclobutane, which may be obtained by processes as described in U.S. Patent No. 2,910,483.

As binding agents or binding agent mixtures which can be diluted with water and which are, as mentioned above, well known in the art, there may, for example, be mentioned alkyd resins neutralized with nitrogen bases such as ammonia and amines which can be diluted with water, and/or phenol resins which can be diluted with water, and/or amino plastics which can be diluted with water. Such binding agents are described, for instance, in the patent specifications Nos. 2,681,894, 2,981,710 and French patent specification No. 943,411.

To such binding agents the lacquer adjuvants of the invention are added as such or dissolved in water and/or in the usual lacquer solvents which can be diluted with water, such as, for example, lower alcohols, ethers, ether alcohols, ketones and esters.

Example

An alkyd resin, produced in known manner from soya oil, trimethylol-propane and adipic acid, with an oil content of 43%, and acid number of 34 and a viscosity of 19 seconds (measured on a 50% solution in xylene according to German Industrial Standard No. 53,211), is dissolved in glycol ether mixture, neutralized with triethylamine and diluted with water to an alkyd resin content of 50%.

A lacquer mixture is produced from 100 parts by weight of this solution by trituration with 36.58 parts by weight of titanium dioxide (finely-dispersed rutile), 84.18 parts by weight very finely ground natural barium sulphate and admixture of 8.28 parts by weight of a 60% aqueous solution of a commercial water-soluble melamine-formaldehyde condensation product produced in usual manner by condensation of melamine with formaldehyde and etherified with methanol the viscosity of a 57 percent by weight solution in water of which at 20° C. is 79 centipoise, and 74.52 parts by weight of water. When this lacquer mixture is applied by dipping, the dip-coated object left in the air for five minutes and then fired, there is obtained a lacquering with a badly damaged surface.

If, however, according to the invention there is added to the above mixture 3.0 parts by weight of a 50% aqueous solution of a polymeric trimethylene oxide derivative with polyether side chains, which had been produced by the reaction of 130 parts by weight of a polymeric 3-ethyl-3-methylol-oxacyclobutane (polymerization degree about 5) with 870 parts by weight of ethylene oxide (by the process according to U.S. Patent No. 2,917,468), then, in the case of lacquering with application by dipping, with the same conditions as above, then there is obtained a smooth, stress-free, uniform surface.

What we claim is:

1. A binding agent system consisting essentially of a water-dilutable solution of an alkyd resin neutralized with nitrogen bases, a phenol-aldehyde resin, an amino-aldehyde resin or mixtures thereof and a polymeric trimethylene oxide derivative having polyether side chains of the formula:

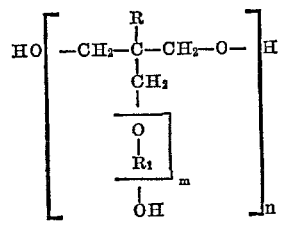

wherein R represents an alkyl residue, the hydroxy methyl or the hydroxy ethyl group, $R_1$ represents at least one member selected from the group consisting of ethylene or propylene, $m$ is a number from 1 to about 100 and $n$ is a number from 1 to about 30.

2. Binding agent systems according to claim 1, wherein the content of polymeric trimethylene oxide derivatives with polyether side chains amounts from about 0.1 to about 10 percent by weight, referred to the solids content of the binding agent systems.

3. A binding agent system according to claim 1 wherein the water-dilutable solution is of an alkyd resin.

4. A binding agent system according to claim 1 wherein $m$ is a number from about 2 to about 30 and $n$ is a number from about 3 to about 10.

5. A binding agent system according to claim 4 wherein R is an alkyl residue having up to 30 carbon atoms, the hydroxy methyl or the hydroxy ethyl group.

References Cited

UNITED STATES PATENTS

| 2,681,894 | 6/1954 | Hoenel | 260—20 |
| 2,910,483 | 10/1959 | Schnell et al. | 260—333 |
| 2,915,486 | 12/1959 | Shelley. | |
| 2,917,468 | 12/1959 | Schnell et al. | |
| 2,981,710 | 4/1961 | Hoenel | 260—20 |
| 3,112,218 | 11/1963 | Spiller. | |
| 3,251,800 | 5/1966 | Cooley et al. | 260—67.6 |

FOREIGN PATENTS 943,411  3/1949  France.

DONALD E. CZAJA, Primary Examiner.

R. W. GRIFFIN, Assistant Examiner.

U.S. Cl. X.R.

117—161; 260—29.2, 29.3, 29.4, 32.8, 33.2, 33.4, 39, 40, 839, 842, 850